Patented Mar. 28, 1944

2,345,255

UNITED STATES PATENT OFFICE 2,345,255

DENTAL IMPRESSION COMPOUND

Charles Victor Gross, Penfield, Pa., assignor to The S. S. White Dental Manufacturing Company, a corporation of Pennsylvania No Drawing. Application June 19, 1940,
Serial No. 341,295

6 Claims. (Cl. 18—47)

This invention relates to the art of preparing impressions which reproduce accurately an article to be copied; and is concerned with a composition for such employment, and the method of using the same.

It is necessary to produce impressions of this nature in various industries, and highly accurate impressions are particularly required in the preparation of dentures, where comfort and appearance demand that the denture should accurately fit the mouth. For example, in preparing a denture, an impression is taken of the gums, and of any remaining teeth. This impression is withdrawn and filled with plastic of Paris, alpha gypsum, or like material to form a matrix which accurately reproduces the mouth and permits the manufacture of the plate in strict conformity with the surface of the mouth, by molding or curing hard rubber, artificial resins, etc., in contact therewith.

Impressions of the oral cavity are commonly taken with plaster of Paris, with thermoplastic organic molding compositions with a resinous base commonly called modeling composition or impression compound, and with hydrocolloidal impression compounds. Each of these materials has disadvantages in practical use. For instance, plaster of Paris is unpleasant to the patient when placed in the mouth; and, furthermore, it sets to a hard brittle mass which will not withdraw from undercuts but must be broken away and removed in pieces. The thermoplastic resinous impression materials are more pleasant to use but they too are hard rigid solids when ready for removal from the mouth and will not withdraw from undercuts without serious distortion. The hydrocolloidal compounds are prepared as viscous warm fluids which stiffen upon cooling to form gels which are sufficiently elastic to withdraw from undercuts without distortion and yield the most accurate impressions of the oral cavity now employed commercially, particularly when impressions are taken of jaws in which there are some standing teeth which may be tipped or otherwise out of alignment to such an extent that very serious undercuts exist. A disadvantage of these hydrocolloid compounds is that considerable time is consumed in their preparation for use; and, furthermore, they must be cooled before withdrawal from the mouth, by means of cold water sprays or by circulating cold water through the trays used in their application.

According to the present invention, an impression compound is provided that can be mixed at room temperature with water to form a paste which can be placed in a tray and applied to the interior of the oral cavity while in its pasty and easily deformable condition, but which will set in a few minutes to a solid which is sufficiently elastic to withdraw from undercuts, etc., without permanent distortion.

The elastic base ingredient in this compound is algin. Readily available forms are ammonium and sodium alginates. Algins are extracted from various sea weeds, such as *Mycrocystis pyrifera*, Laminaria, Phaeophyceo, Nerocystis, Macrocystis, and the like: and are obtainable in a number of forms with acidities from pH 5 to pH 7 or more. The employable algins form colloidal solutions in water. These solutions may be caused to gel by adding acids which precipitate the alginic acid, or by adding salts of bivalent metals such as calcium, strontium, barium, zinc, cadmium, copper, lead, etc. For example, a suitable gelling agent is calcium citrate. This salt is sparingly soluble in water and may be suspended in dilute algin solutions without prematurely forming the gel.

It is preferred to add substantially inert fillers such as finely powdered silica, talc, ground marble, precipitated chalk, or mixtures of such fillers; as it is difficult to mix the pure gum with water to form a smooth stiff paste, and the set jelly from such a paste does not have sufficient stiffness to make a satisfactory mold into which plaster of Paris, alpha gypsum, etc., can be cast to form a matrix from which the denture or other reproduction may be made.

It is important to control the rate of gelling by adding an acid or a bivalent metal salt of such a reactivity that the gelation occurs slowly. This permits the compound to be mixed to a smooth paste and inserted into the mouth before gelation occurs. After the compound is in place, gelation proceeds and an elastic mass is formed which can be withdrawn from undercuts without permanent deformation. Such setting agents may be added as such or may be formed in the mixed compound by double decomposition.

For instance, calcium borate has been found to be an excellent gelling agent. It may be added to the dry compound as such or it may be formed after the compound is mixed by adding to the dry compound calcium citrate and sodium biborate (borax). On contact with water calcium borate is formed which effectively sets the compound at the proper rate. If calcium carbonate is present in the compound, forming part or all of the filler used, the addition of borax alone will cause the compound to gel when mixed with water. In the absence of substances containing bivalent ions, borax alone will not cause the compound to gel.

A suitable impression compound can be made by thoroughly blending the following. All ingredients must be in the form of powders passing a 60 mesh or finer sieve.

A suitable formula is:

| | Parts by weight |
|---|---|
| Algin (commercial ammonium alginate) | 9.0 |
| Calcium borate | 0.5 |
| Precipitated chalk | 90.5 |

Coloring or flavoring may be added if desired.

The compound is prepared for impression taking by mixing with an equal weight of water, for instance, 30 grams of powder are spatulated with 30 cubic centimeters of water in a cup, rubber plaster bowl, or other suitable container. A soft plastic mass of about the consistency of wall plaster is produced. This mass is placed in a perforated impression tray or in a tray provided with an undercut rim or other retainer for the set mass, carried to the mouth, and firmly pressed home. Three or four minutes after the mass is placed in the mouth, it has gelled to a tough elastic solid which can be withdrawn from the mouth in one piece.

The mass after gelling does not adhere to the mouth, teeth, nor to the impression tray which makes it preferable to use a perforated tray or one with an undercut rim or other suitable retaining means. A replica of the mouth is obtained by casting plaster of Paris or alpha gypsum into the impression.

The qualities of the compound may be varied by varying the proportions of alginate and filler. For instance, if a very elastic material is desired, the gum may be increased to 30 percent or more, but this may be reduced to 4 percent if a very rigid product is sought. The calcium borate or other setting agent must, of course, be correspondingly changed and obviously a different quantity of water will be required to make a mass of the desired consistency. The percentage of calcium borate or other setting agent, calculated on the quantity of gum present, fixes the rate at which the particular compound will set. Below 1 percent of the alginate, firm jellies are not produced. Above 20 percent, the action is usually too rapid for practical use.

Calcium borate has been found to be one of the best gelling agents for my particular purpose. It may be added as such or it may be produced by double decomposition in the compound with equivalent results. Satisfactory compounds may be made with many other sparingly soluble salts of bivalent metals and with sparingly soluble acids such as boric, benzoic, or salicylic, also with salts having an acid reaction such as aluminum sulfate alum, sodium acid sulfate, etc., particularly when carbonates, oxids or hydroxids of bivalent metals are present in the compound.

The gist of the invention resides in the employment of an algin in association with a sparingly soluble gum precipitating agent and an inert filler, these ingredients being provided as an intimately mixed powdery mass which is capable of reacting with water to primarily form a paste having the distended gum therein in a form resembling mucilage in which the filler particles are suspended, so that an accurate contacting with the surface to be reproduced is feasible, followed by the precipitating action of the agent as it goes into solution and becomes effective.

It is is obvious that other materials can be employed for producing such a composition, and that the practice may be modified within the scope of the appended claims.

I claim:

1. A dry composition adapted upon mixing with water to form an impression paste capable of setting to an elastic solid, comprising an algin in the form of a fine powder, powdered calcium borate in the proportion of 1 to 20 percent of the weight of the gum, and a powdered inert filler in a quantity of 3 to 25 times the weight of the gum, said ingredients being intimately mixed together.

2. A dry composition adapted upon mixing with water to form an impression paste capable of setting to an elastic solid, comprising substantially nine parts of algin in the form of a fine powder, one-half part of powdered calcium borate, and substantially ninety parts of a powdered inert filler, said ingredients being intimately mixed together.

3. A dry composition adapted upon mixing with water to form an impression paste which of itself sets to form an elastic solid, comprising a powdery water-soluble algin capable of producing a mucilage upon water solution, powdered calcium citrate, and a powdered inert filler, said dry ingredients being intimately mixed together.

4. A dry composition adapted upon mixing with water to form an impression paste which of itself sets to form an elastic solid, comprising a powdery water-soluble algin capable of producing a mucilage upon water solution, powdered calcium citrate and powdered borax, and a powdered inert filler, said dry ingredients being intimately mixed together.

5. A dry composition adapted upon mixing with water to form an impression paste which of itself sets to form an elastic solid, comprising a powdery water-soluble algin capable of producing a mucilage upon water solution, a sparingly soluble calcium compound in powdered form, borax powder, and a powdered inert filler, said dry ingredients being intimately mixed together.

6. A dry composition adapted upon mixing with water to form an impression paste which of itself sets to form an elastic solid, comprising a powdery water-soluble algin capable of producing a mucilage upon water solution, a powdery algin precipitating agent capable in the presence of water of providing calcium borate, and a powdered inert filler, said dry ingredients being intimately mixed together.

CHARLES VICTOR GROSS.